(12) United States Patent
Harris

(10) Patent No.: US 11,582,308 B2
(45) Date of Patent: Feb. 14, 2023

(54) SYSTEM FOR MONITORING MACHINERY AND WORK AREAS OF A FACILITY

(71) Applicant: WPR Services, LLC, Fishers, IN (US)

(72) Inventor: Christopher Harris, Fishers, IN (US)

(73) Assignee: WPR Services, LLC, Fishers, IN (US)

( * ) Notice: Subject to any disclaimer, the term of this patent is extended or adjusted under 35 U.S.C. 154(b) by 245 days.

(21) Appl. No.: 16/744,253

(22) Filed: Jan. 16, 2020

(65) Prior Publication Data

US 2020/0228603 A1 Jul. 16, 2020

Related U.S. Application Data

(60) Provisional application No. 62/793,142, filed on Jan. 16, 2019.

(51) Int. Cl.

| | |
|---|---|
| *H04L 67/125* | (2022.01) |
| *H04N 7/18* | (2006.01) |
| *H04W 84/18* | (2009.01) |
| *H04B 3/54* | (2006.01) |
| *H04L 51/10* | (2022.01) |
| *H04L 69/16* | (2022.01) |

(52) U.S. Cl.
CPC ........... *H04L 67/125* (2013.01); *H04N 7/188* (2013.01); *H04B 3/542* (2013.01); *H04L 51/10* (2013.01); *H04L 69/16* (2013.01); *H04N 7/181* (2013.01); *H04W 84/18* (2013.01)

(58) Field of Classification Search
CPC ....... H04L 67/125; H04L 51/10; H04L 69/16; H04N 7/188; H04N 7/181; H04B 3/542; H04W 84/18

USPC ......................................................... 702/183
See application file for complete search history.

(56) References Cited

U.S. PATENT DOCUMENTS

| | | | | |
|---|---|---|---|---|
| 2014/0247347 | A1* | 9/2014 | McNeill | H04N 7/18 382/103 |
| 2015/0316909 | A1* | 11/2015 | Govindaraj | G06F 16/285 700/19 |
| 2016/0283443 | A1* | 9/2016 | Michalscheck | F16K 35/00 |
| 2016/0284073 | A1* | 9/2016 | Michalscheck | G06T 7/001 |
| 2017/0195265 | A1* | 7/2017 | Billi | G06Q 10/0631 |
| 2018/0052835 | A1* | 2/2018 | Billi-Duran | G06F 16/487 |
| 2018/0130260 | A1* | 5/2018 | Schmirler | G06F 3/011 |
| 2018/0131907 | A1* | 5/2018 | Schmirler | H04N 5/23238 |
| 2018/0301171 | A1* | 10/2018 | Yamana | G06Q 10/0631 |
| 2018/0321836 | A1* | 11/2018 | Tappan | G05B 23/0272 |
| 2019/0122435 | A1* | 4/2019 | Prideaux-Ghee | G06T 15/20 |
| 2019/0147655 | A1* | 5/2019 | Galera | G06T 15/20 345/419 |
| 2019/0258863 | A1* | 8/2019 | Billi | G06V 20/41 |

* cited by examiner

*Primary Examiner* — Nicholas R Taylor
*Assistant Examiner* — Chong G Kim
(74) *Attorney, Agent, or Firm* — Maginot, Moore & Beck, LLP

(57) ABSTRACT

A system for monitoring a plurality of machines of a facility is disclosed. The system comprises a plurality of data network devices configured to communicate with one another via at least one network. The data network devices are configured to collect machine data from the plurality of machines and distribute the machine data via the at least one network. The system further comprises data display devices configured to provide a graphical user interface that enables a user to view and analyze the machine data that is collected and distributed by the data network devices.

20 Claims, 7 Drawing Sheets

SYSTEM FOR MONITORING MACHINERY AND WORK AREAS OF A FACILITY

This application claims the benefit of priority of U.S. provisional application Ser. No. 62/793,142, filed on Jan. 16, 2019 the disclosure of which is herein incorporated by reference in its entirety.

FIELD

The device and method disclosed in this document relates to industrial facilities and, more particularly, to monitoring data of industrial machines and work areas.

BACKGROUND

Unless otherwise indicated herein, the materials described in this section are not prior art to the claims in this application and are not admitted to the prior art by inclusion in this section.

An industrial facility generally comprises a large environment with a wide array of machines and work areas that are operated and monitored by a large number of employees. Due to the large scale and complexity of many industrial facilities, effective management and monitoring of the macro-level concerns of the facility, such as safety, productivity, and efficiency, can become difficult or impossible. Accordingly, what is needed is a system for real-time monitoring of the facility that provides the detail necessary to quickly identify and address issues in the facility.

SUMMARY

A system for monitoring a plurality of machines of a facility is disclosed. The system comprises a plurality of networked electronic devices configured to communicate with one another via at least one network, at least one first networked electronic device of the plurality of networked electronic devices being connected to a respective machine of the plurality of machines and configured to receive machine data from the respective machine and transmit the machine data on the at least one network. The system comprises at least one computing device having a display screen, the at least one computing device being configured to receive the machine data from the at least one first networked electronic device and display a graphical user interface on the display screen, the graphic user interface including a graphical depiction of the machine data.

BRIEF DESCRIPTION OF THE DRAWINGS

The foregoing aspects and other features of the system are explained in the following description, taken in connection with the accompanying drawings.

DETAILED DESCRIPTION

Figure 1:
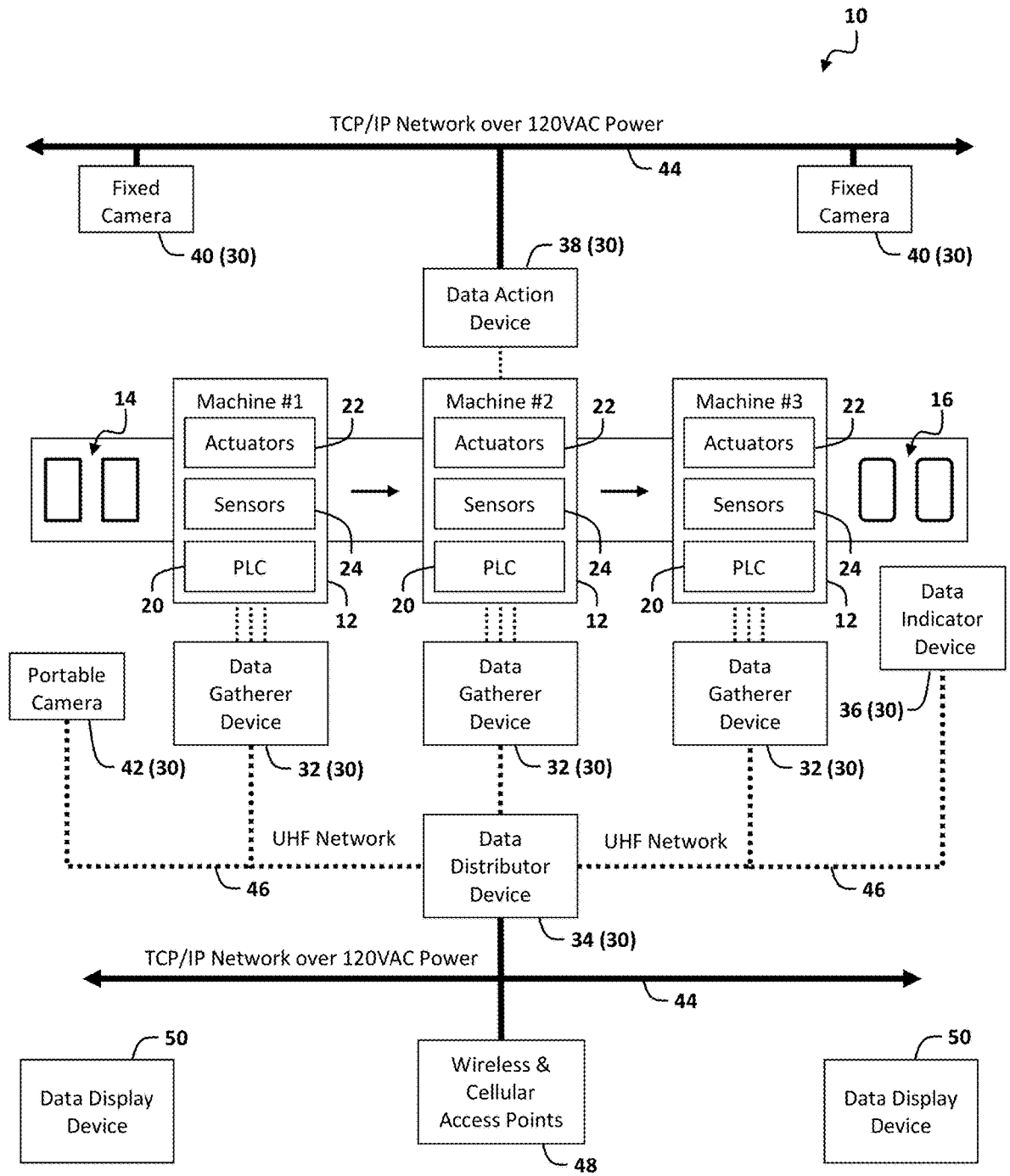
FIG. 1 shows an industrial facility having machines and a data collection and distribution network for monitoring and controlling the machines.

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles of the disclosure as would normally occur to one skilled in the art which this disclosure pertains.

FIG. 1 illustrates an industrial facility 10 such as a factory, warehouse, or distribution center. The facility 10 includes a plurality of machines 12 which operate autonomously or under the direction of facility personnel to perform some task, such as the assembly or packaging of goods. In at least some embodiments, the machines 12 perform the task by way of a sequence of steps or individual processes that transform input materials 14 into output products 16. Each machine 12 may perform one or more individual processes of the task. To this end, each machine 12 comprises at least one controller 20 configured to operate one or more actuators 22, such as robots, motors, conveyers, blowers, relays, etc., to perform respective processes of the task. Each machine 12 may further comprise one or more sensors 24 configured to monitor or enable performance of the processes performed by the machine 12, such as temperature sensors, vibration sensors, acoustic sensors, smoke or particulate sensors, speed sensors, torque sensors, position sensors, etc.

The controllers 20 of the machines may take the form of, for example, programmable logic controllers (PLC). The programmable logic controllers 20 at least comprise a processor, associated memory, and an input/output module. The memory is configured to store program instructions that, when executed by the processor, at least enable the programmable logic controller 20 to operate the actuators 22 and sensors 24 to perform and monitor processes performed by the respective machine 12. The input/output module enables the programmable logic controller 20 to receive inputs from the sensors 24 or other input devices and to output control signals to operate the actuators 22, as well as output data to other systems. The memory may be of any type of device capable of storing information accessible by the processor, such as a memory card, ROM, RAM, hard drives, discs, flash memory, or any of various other computer-readable medium serving as data storage devices, as will be recognized by those of ordinary skill in the art. Additionally, it will be recognized by those of ordinary skill in the art that a "processor" includes any hardware system, hardware mechanism or hardware component that processes data, signals or other information. Thus, the processor may include a system with a central processing unit, graphics processing units, multiple processing units, dedicated circuitry for achieving functionality, programmable logic, or other processing systems.

The facility 10 further includes a data collection and distribution network for advantageously enabling the convenient monitoring and control of the machines 12. The data collection and distribution network comprises a plurality of data network devices 30. Each data network device 30 comprises at least some similar components with one another, particularly for communications with one another, but may otherwise be configured to perform different and customizable roles in the data collection and distribution network. For example, in the illustrated embodiment, the plurality of data network devices 30 includes devices configured as data gatherer devices 32, a data distributor device 34, a data indicator device 36, a data action device 38, fixed cameras 40, and a portable camera 42.

The data network devices 30 are configured to communicate with one another via one or more data networks. In at least one embodiment, the data network devices 30 communicate with one another with a combination of both wireless and wired networks. Particularly, in the illustrated embodiment, some or all of the data network devices 30 are configured to communicate, in part, via a wired network 44, (e.g., TCP/IP or equivalent network) that is implemented on existing power lines (e.g., single-phase or three-phase 120 VAC) of the facility 10 using a suitable power-line communications technique. This advantageously provides a reliable wired network, while minimizing the outlay of additional cables in the facility 10. In some embodiments, the data network devices 30 are alternatively or additionally configured to communicate via an existing Ethernet cable network of the facility 10. In some embodiments, the data network devices 30 are alternatively or additionally configured to communicate via a low voltage ground wire of the machines 12.

In addition to the wired network 44, in the illustrated embodiment, some or all of the data network devices 30 are configured to communicate, in part, via a wireless network 46 (e.g., a ultra-high frequency (UHF) radio network). This advantageously enables redundancy in the event that all or part of the wired network 44 fails and enables certain data network devices 30 to be portable or installed in locations at which a wired connection is not easily deployed. In at least some embodiments, the wireless network 46 is configured as a mesh network in which each data network devices 30 can communicate with each other data network device 30 connected to the wireless network 46. However, additional network topologies may also be utilized, such as star, tree, bus, or ring network topologies, or combinations thereof.

As noted above, the data network devices 30 are configured or configurable to fulfill different roles in the data collection and distribution network. The data gatherer devices 32 are configured to gather machine data from of one or more machines 12. As used herein "machine data" may include both PLC data received from the programmable logic controller 20 and sensor data received from the sensors 24. The PLC data may, for example, include inputs and outputs for controller logic (including intermediate outputs), control signals for operating the actuators 22, feedback signals for operating the actuators 22, operating states of the actuators 22 or of the machine 12 (e.g., on, off, faulted, idle, setup mode), and open/closed states for relays or other switches, as well as any other control variable or state variable that is used by a programmable logic controller 20 of a respective machine 12. The sensor data may include temperature data, vibration data, acoustic data, smoke or particulate data, speed data, torque data, position data, or any other data from a sensor of the machine 12.

The data gatherer devices 32 are configured to broadcast or otherwise transmit the machine data via the one or more data networks of the data collection and distribution network. Particularly, in the illustrated embodiment, the data gatherer devices 32 are configured to transmit the machine data via the wireless network 46 (e.g., the UHF wireless network) to other data network devices, such as the data distributor device 34. In the illustrated embodiment, the data gatherer devices 32 do not have a direct connection to the wired network 44 (e.g., the TCP/IP network over 120 VAC power lines) and only has a direct connection to the wireless network 46 (e.g., the UHF wireless network). If a data gatherer device 32 is also connected to the wired network 44 (e.g., the TCP/IP network over 120 VAC power lines), then the data gatherer devices 32 are configured to transmit the machine data via the wired network 44 as well.

In some embodiments, the data gatherer devices 32, as well as any other of the data network devices 30, are configured to relay the machine data that are received from other data network devices 30 by similarly transmitting the received data via the one or more data networks of the data collection and distribution network. In this way, the data network devices 30 can flexibly operate with the various different network topologies described above.

The data distributor device 34 is essentially similar to the data gatherer devices 32 except that it does not directly collect any machine data. Instead, it operates to relay the machine data that are received from other data network devices 30 by transmitting the received data via the one or more data networks of the data collection and distribution network. For example, in the illustrated embodiment, the data gatherer devices 32 do not have a direct connection to the wired network 44 (e.g., the TCP/IP network over 120 VAC power lines) and only has a direct connection to the wireless network 46 (e.g., the UHF wireless network). The data distributor device 34 operates as a bridge between the wireless network 46 and the wired network 44. In this way, any data network devices 30 that only have a direct connection with the wireless network 46 can communicate with data network devices 30 on the wired network 44 and, likewise, any data network devices 30 that only have a direct connection with the wired network 44 can communicate with data network devices 30 on the wireless network 46. In some embodiments, the data distributor device 34 is configured to operate as a server and may store the machine data and provide the machine data to other data network devices 30 or to client devices, such as the data display devices 50 described in more detail below.

The data indicator device 36 is essentially similar to the data gatherer devices 32 except that it does not directly collect any machine data. Instead, the data indicator device 36 includes one or more data indicators or audio/visual output devices via which certain data can be displayed or otherwise output, such as one or more colored lights, a number display (e.g., 7 segment LED or the like), an LCD display screen, a speaker, or any other output device. The data indicator device 36 is configured to display certain information based on a set of rules or other predetermined logic. For example, a data indicator device 36 may include a colored light that displays an operating state of a particular machine (e.g., on, off, faulted, idle, setup mode). As another example, the data indicator device 36 may include a number display that displays a production queue or finished product count. The data indicator device 36 may also operate to relay the machine data that are received from other data network devices 30 by transmitting the received data via the one or more data networks of the data collection and distribution network.

The data action device 38 is essentially similar to the data gatherer devices 32 except that it does not directly collect any machine data. Instead, the data action device 38 is configured to take action in response to a predetermined event or in response to an input from an operator via an input device. Particularly, the data action device 38 may send commands to the programmable logic controller 20 of an associated machine 12 to control an operation of the machine 12 in response to a predetermined event or in response to an input from an operator via an input device. As an example, in response to a fire or other safety hazard, the data action device 38 may send commands to the programmable logic controller 20 to disable the machine 12 or particular actuators 24 of the machine 12 that pose a safety risk. The data action device 38 may include an input device, such as a knob or push button, via which an operator can trigger an action to be performed by the data action device 38. The data action device 38 may also operate to relay the machine data that are received from other data network devices 30 by transmitting the received data via the one or more data networks of the data collection and distribution network.

It should be appreciated that these particular configurations the data network devices 30 are merely exemplary. Any of the data network devices 30 may be configured to perform the operations attributed to any of the data gatherer devices 32, the data distributor device 34, the data indicator device 36, or the data action device 38, described above. Particularly, a data network device 30 may be configured to collect data, relay data, output/indicate data, and take action in response to an event. In some embodiments, each of the data network devices 30 may comprise identical hardware and features, and may be installed with a custom configuration depending on the particular functions it needs to serve in the data collection and distribution network.

Figure 2A:
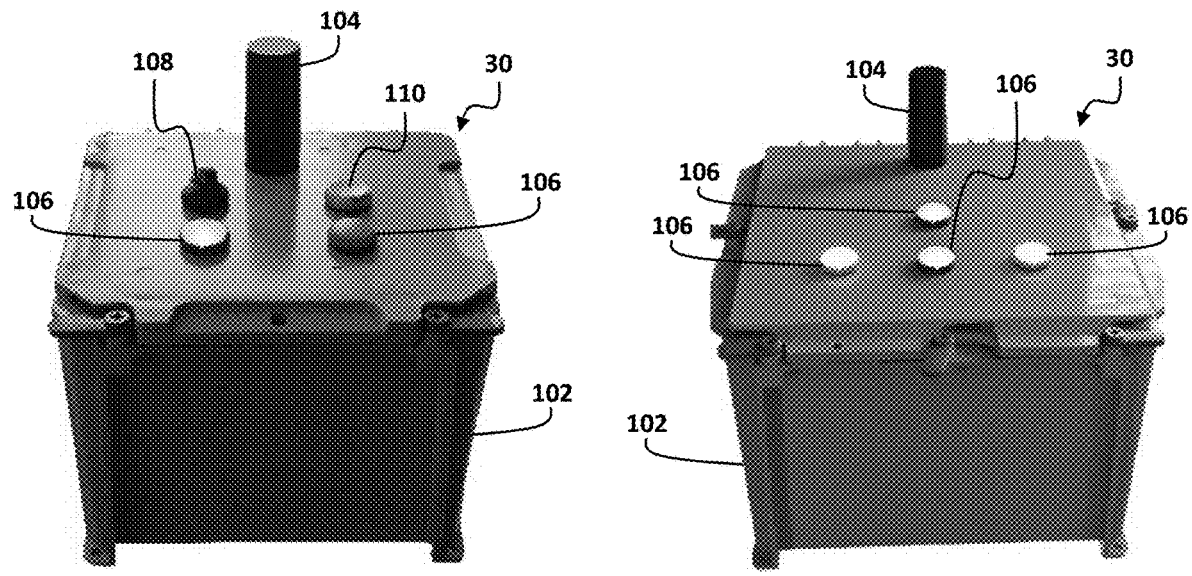
FIGS. 2A and 2B show exemplary embodiments of data network devices of the data collection and distribution network.
Figure 2B:
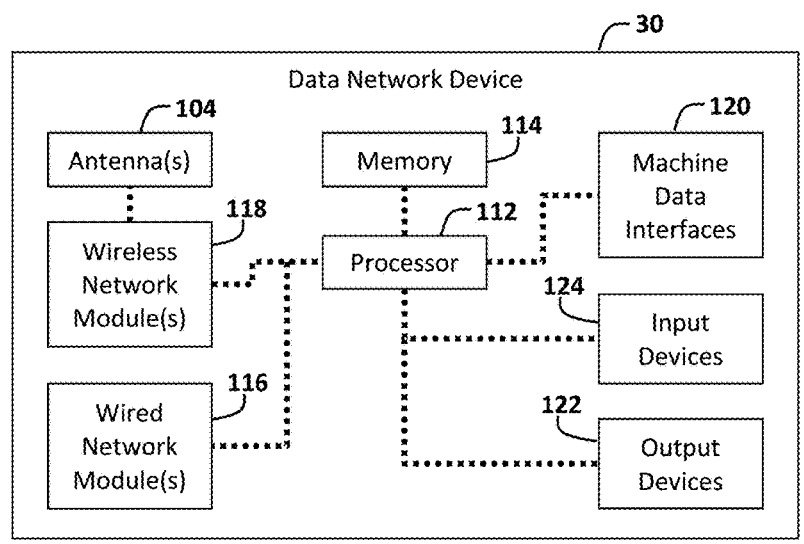

FIGS. 2A and 2B show exemplary embodiments of data network devices 30 of the data collection and distribution network. However, it should be appreciated that the illustrated embodiments of the data network devices 30 are only exemplary embodiments of the data network devices 30 and are merely representative of any of various manners or configurations of a data network devices device that is operative in the manner set forth herein.

With reference to FIG. 2A, exemplary physical embodiments of the data network devices 30 are shown. In the illustrated embodiment, the data network devices 30 each include an enclosure 102 configured to house the various electronics of the data network devices 30. In one embodiment, the enclosure 102 is climate controlled. The data network devices 30 each comprise an external antenna 104, which extends out of the enclosure 102. It will be appreciated, however, that the data network devices 30 may similarly comprise an internal antenna that is contained within the enclosure 102. In one embodiment, the antenna 104 is an omnidirectional antenna. The data network devices 30 may comprise indicator lights 106 configured to indicate information, as described above with respect to the data indicator device 36. The data network device 30 may further comprise input devices such as a knob 108 and a push button 110 configured to receive inputs from an operator. The knob 108 and the push button 110 may be configured to trigger an action, as described above with respect to the data action device 38.

With reference to FIG. 2B, exemplary electronic components of a data network device 30 are shown. Particularly, each data network device 30 at least includes a processor 112 and associated memory 114. The memory 114 is configured to store program instructions that, when executed by the processor 112, at least enable the processor 112 operate the data network device 30 to perform the functions and operations described herein. The memory 114 may be of any type of device capable of storing information accessible by the processor 112, such as a memory card, ROM, RAM, hard drives, discs, flash memory, or any of various other computer-readable medium serving as data storage devices, as will be recognized by those of ordinary skill in the art. Additionally, it will be recognized by those of ordinary skill in the art that a "processor" includes any hardware system, hardware mechanism or hardware component that processes data, signals or other information. Thus, the processor 112 may include a system with a central processing unit, graphics processing units, multiple processing units, dedicated circuitry for achieving functionality, programmable logic, or other processing systems.

Additionally, each data network device 30 includes one or both of wired network module(s) 116 and wireless network module(s) 118 with associated antenna(s) 104. The wired network module(s) 116 include one or more transceivers, modems, processors, memories, oscillators, or other hardware conventionally included in communication devices configured to enable communications with various other devices, at least including the other data network devices 30, via the wired network 44 (e.g., the TCP/IP network over 120 VAC power lines). Likewise, the wireless network module(s) 118 one or more transceivers, modems, processors, memories, oscillators, or other hardware conventionally included in communication devices configured to enable communications with various other devices, at least including the other data network devices 30, via the wireless network 46 (e.g., the UHF wireless network). The processor 112 is configured to operate the wired network module(s) 116 and wireless network module(s) 118 to send and receive the machine data discussed above.

In at least some embodiments, such as in the case of the data gatherer devices 32, the data network devices 30 include one or more machine data interfaces 120 configured to interface with and communicate with the programmable logic controllers 20 of the machines 12. The processor 112 is configured to operate the machine data interfaces 120 to interface with the programmable logic controllers 20 to receive the machine data from the machine 12. In some embodiments, the machine data interfaces 120 are configured to receive both digital and analog signals from the machine 12. In some embodiments, the machine data interfaces 120 include a serial communication interface (e.g., RS-232) configured to receive serial data from the programmable logic controllers 20 and/or the sensors 24. In some embodiments, such as in the case of the data action devices 38, the processor 112 is configured to operate the machine data interfaces 120 to send command signals to the programmable logic controllers 20 and/or to the actuators 22 in order to take some action (e.g., turn off a motor or blower) in response to some event occurring (e.g., a fire or other safety hazard being detected).

In at least some embodiments, such as in the case of the data indicator devices 36, the data network devices 30 include one or more audio/visual output devices 122 via which certain data can be displayed or otherwise output. The output devices 122 may include, for example, colored lights (e.g., the indicator lights 106), a number display, an LCD display screen, a speaker, or any other output device. In one embodiment, the processor 112 is configured to operate output devices 122 to display or otherwise output certain information based on a set of rules or other predetermined logic applied to machine data received or collected.

In at least some embodiments, such as in the case of the data action devices 38, the data network devices 30 include one or more input devices 124 via which an operator can provide inputs to trigger some action. The input devices 124 may include, for example, a knob (e.g., the knob 108) or a push button (e.g., the push button 110). In one embodiment, the processor 112 is configured to receive an input from an operator via the input devices 124 and operate another component of the data network devices 30 or send commands to a machine 12 in response to the input to perform some action.

In at least some embodiments, the data network devices 30 may include or be operably connected to a backup battery (not shown) for backup power. The backup battery may be connected to solar panels (not shown) for charging the backup battery.

Returning to FIG. 1, the fixed cameras 40 and the portable camera 42 are configured to record video of a work area or machine 12 of the facility 10. In at least some embodiments, the fixed cameras 40 and the portable camera 42 are configured to automatically record video clips in response to a particular triggering event occurring. The triggering event may be, for example, detecting a fault of one of the machines 12, detecting an emergency situation or safety hazard situation, detecting a door opening, detecting a person, or any other custom triggering event. In some embodiments, the camera 40, 42 is configured to detect the triggering event itself based on a suitable video processing technique. In other embodiments, some other device, such as a data gatherer device 32 or the programmable logic controller 20 of a machine 12, detects the triggering event and sends an event message or signal to the camera 40, 42. In at least one embodiment, the camera 40, 42 is configured to continuously store a video buffer to enable the camera 40, 42 record video clips that start a predetermined amount of time before the triggering event (e.g., 9 seconds) and end a predetermined amount of time after the triggering event (e.g., 9 seconds). In some embodiments, the camera 40, 42 is configured to record a time lapse photo progression in which a photo is captured periodically over hours or days.

Figure 3A:
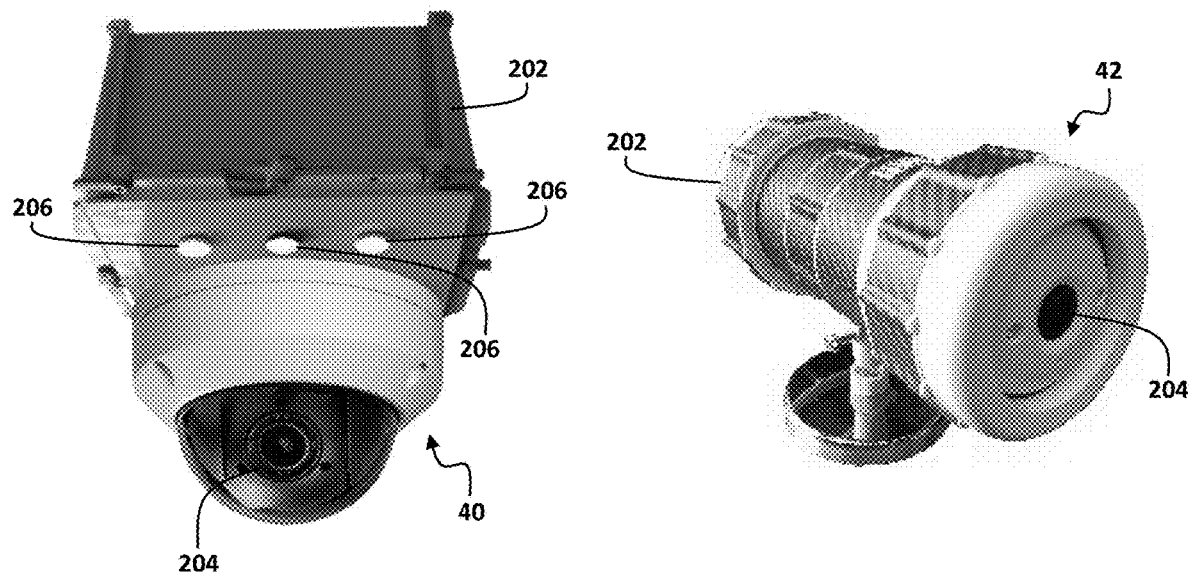
FIGS. 3A and 3B show exemplary embodiments of cameras of the data collection and distribution network.
Figure 3B:
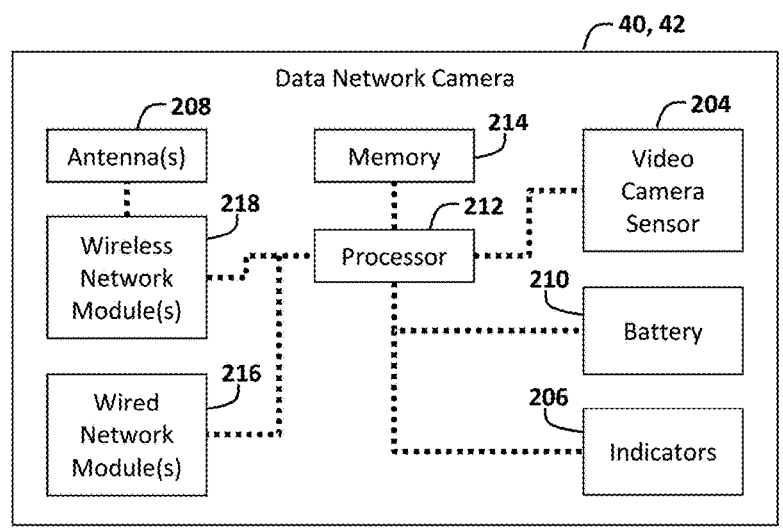

FIGS. 3A and 3B show exemplary embodiments of the cameras 40, 42 of the data collection and distribution network. However, it should be appreciated that the illustrated embodiments of the cameras 40, 42 are only exemplary embodiments of the cameras 40, 42 and are merely representative of any of various manners or configurations of a camera that is operative in the manner set forth herein.

With reference to FIG. 3A, exemplary physical embodiments of the fixed cameras 40 and the portable camera 42 are shown. In the illustrated embodiment, the cameras 40, 42 each include an enclosure 202 configured to house the various electronics of the cameras 40, 42, as least including a video camera sensor 204. In the illustrated embodiment, the fixed camera further comprises indicator lights 206 configured to indicate information, as described above with respect to the data indicator device 36.

With reference to FIG. 3B, exemplary electronic components of the cameras 40, 42 are shown. Particularly, each cameras 40, 42 at least includes a processor 212 and associated memory 214. The memory 214 is configured to store program instructions that, when executed by the processor 212, at least enable the processor 212 operate the cameras 40, 42 to perform the functions and operations described herein. The memory 214 may be of any type of device capable of storing information accessible by the processor 212, such as a memory card, ROM, RAM, hard drives, discs, flash memory, or any of various other computer-readable medium serving as data storage devices, as will be recognized by those of ordinary skill in the art. Additionally, it will be recognized by those of ordinary skill in the art that a "processor" includes any hardware system, hardware mechanism or hardware component that processes data, signals or other information. Thus, the processor 212 may include a system with a central processing unit, graphics processing units, multiple processing units, dedicated circuitry for achieving functionality, programmable logic, or other processing systems.

The video camera sensor 204 is configured to capture photos and videos of a work area or machine 12 of the facility 10. In at least some embodiments, the processor 212 is configured to operate the video camera sensor 204 to automatically record video clips in response to a particular triggering event occurring. In some embodiments, the processor 212 is configured to operate the video camera sensor 204 to record a time lapse photo progression in which a photo is captured periodically over hours or days. In some embodiments, the processor 212 is configured to process images received from the video camera sensor 204 using a suitable video processing technique to detect the triggering event itself. In other embodiments, the processor 212 receives an event message or signal from some other that detects the triggering event. In at least one embodiment, the processor 212 is configured to continuously store in the memory 214 a video buffer to enable the camera 40, 42 record video clips that start a predetermined amount of time before the triggering event (e.g., 9 seconds) and end a predetermined amount of time after the triggering event (e.g., 9 seconds).

Additionally, each camera 40, 42 includes one or both of wired network module(s) 216 and wireless network module(s) 218 with associated antenna(s) 208. The wired network module(s) 216 include one or more transceivers, modems, processors, memories, oscillators, or other hardware conventionally included in communication devices configured to enable communications with various other devices, at least including the other data network devices 30, via the wired network 44 (e.g., the TCP/IP network over 120 VAC power lines). Likewise, the wireless network module (s) 218 one or more transceivers, modems, processors, memories, oscillators, or other hardware conventionally included in communication devices configured to enable communications with various other devices, at least including the other data network devices 30, via the wireless network 46 (e.g., the UHF wireless network). The processor 212 is configured to operate the wired network module(s) 216 and wireless network module(s) 218 to send video data or image data to the other data network devices 30.

In some embodiments, the camera 40, 42 may include one or more audio/visual output devices, such as the indicators 206. In one embodiment, the processor 112 is configured to operate output devices to display or otherwise output certain information based on a set of rules or other predetermined logic. Additionally, the camera 40, 42 may further include a battery 210 configured to provide operational power or backup power to the camera 40, 42.

Returning to FIG. 1, the data collection and distribution network of the facility 10 further includes one or more access points 48 configured to connect the data collection and distribution network to other networks. In some embodiments, the access points 48 include hardware for connecting to a local area network (e.g., a local Wi-Fi and/or Ethernet TCP/IP network) that is managed by, for example, a router and which is connected to the Internet by a modem. In some embodiments, the access points 48 include hardware for connecting to a cellular network, such as those known in the art for wireless telephony.

The data collection and distribution network further includes a plurality of data display devices 50. The data display devices 50 may comprise any computing device such as a desktop computer, a laptop, a smart phone, a tablet, a personal digital assistant (PDA), a smart watch, or other personal electronic device. The data display devices 50 may include portable computing devices that carried by personnel within the facility 10, as well fixed computing devices mounted throughout the facility, such as at particular work stations or machines, in a shared break room, or in a manager's office.

The data display devices 50 include software for enabling a user to view and analyze machine data that has been collected and distributed by the data network devices 30. Particularly, the data display devices 50 are at least configured to display a graphical user interface on a display screen thereof that enables the user to view and analyze the machine data that is collected and distributed by the data network devices 30. Additionally, the data display devices 50 may be configured to process the machine data to provided analysis and summary information regarding operations of the facility 10. In at least some embodiments, the data display devices 50 are configured to access the machine data that is collected and distributed by the data network devices 30 via the access points 48. However, in some embodiments, the data display devices 50 may have a direct connection to the wired network 44 or the wireless network 46.

In some embodiments, the data display devices 50 are configured to provide a messenger services in which a user can send a message to another data display device, thereby enable communications between facility personnel with management personnel and amongst the facility personnel themselves. In this way, facility personnel can quickly and easily report issues that have occurred in the facility or with respect to a particular machine. In some embodiments, a total number of messages sent during a predetermined time period (e.g., a single day) can be counted and provided to a manager in the form of an email, or the like. In this way, a manager can be informed of how many issues arose during the predetermined time period.

In some embodiments, the data display devices 50 are configured to enable the user to view a live video feed from one of the cameras 40, 42 or review previously recorded video clips or photo progressions associated with triggering events that have occurred in the facility. In some embodiments, in response to a triggering event, the data display devices 50 may be configured to automatically send an email to certain management personnel of the facility 10 or to designated outside technicians alerting them over the event. In some embodiments, automatic email includes the associated recorded video clips or photo progressions from the cameras 40, 42. In some embodiments, automatic email includes machine data from a machine 12 that is associated with the triggering event. In some embodiments, management personnel or outside technicians can remotely monitor, troubleshoot, or control a machine 12 associated with a triggering event.

Figure 4A:
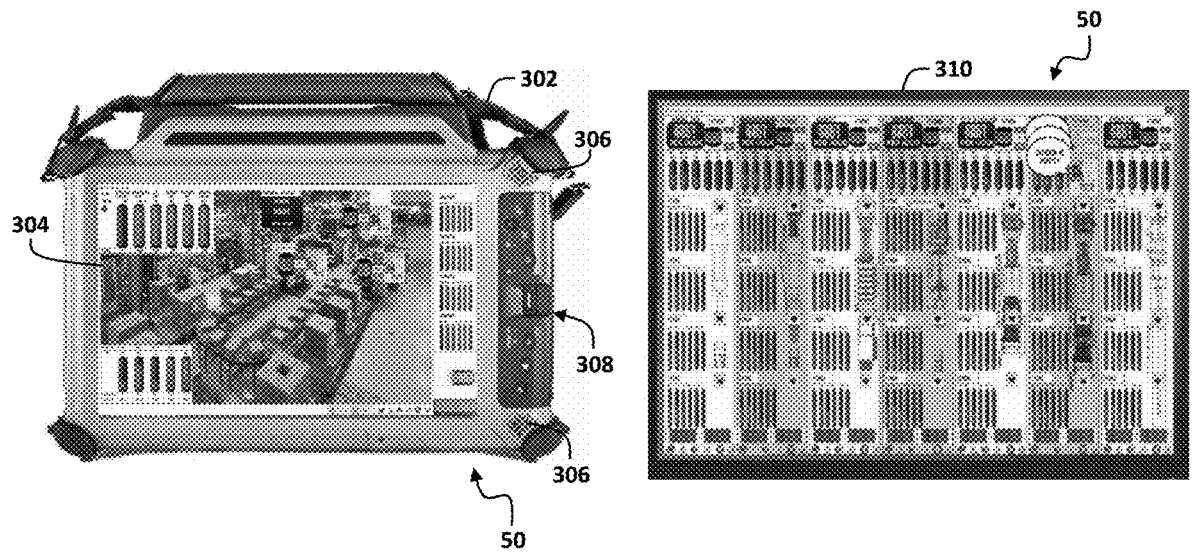
FIGS. 4A and 4B show exemplary embodiments of data display devices of the data collection and distribution network.
Figure 4B:
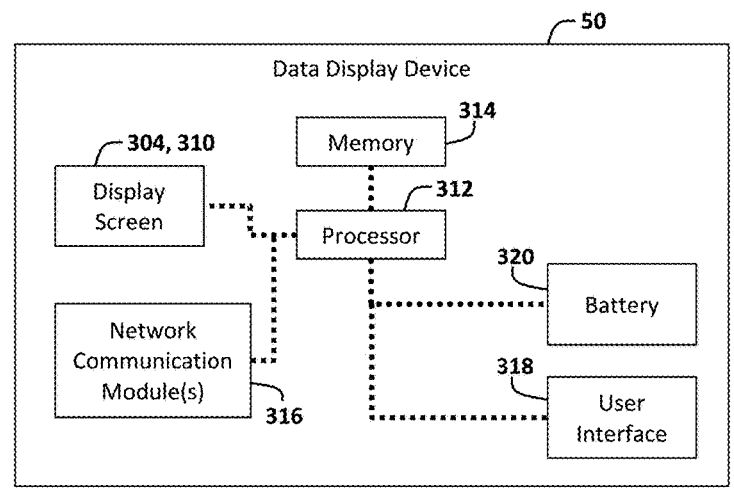

FIGS. 4A and 4B show exemplary embodiments of data display devices 50 of the data collection and distribution network. However, it should be appreciated that the illustrated embodiments of the data display devices 50 are only exemplary embodiments of the data display devices 50 and are merely representative of any of various manners or configurations of a data display device that is operative in the manner set forth herein.

With reference to FIG. 4A, exemplary physical embodiments of the data display devices 50 are shown. In the illustrated embodiments, the data display device 50 on the left comprises a portable tablet computer having a rugged enclosure 302 with a touch screen display 304, speakers 306, and buttons 308 integrated into the enclosure 302. In contrast, the data display device 50 on the right comprises a discrete display screen 310, which is connected to a desktop computer or the like (not shown). In either case, the data display device 50 is configured to display a graphical user interface via which a user can view the machine data that is collected and distributed by the data network devices 30, as well as information derived therefrom.

With reference to FIG. 4B, exemplary electronic components of a data display device 50 are shown. Particularly, in the illustrated embodiment, the data display device 50 comprises a processor 312 and associated memory 314. The memory 314 is configured to store program instructions that, when executed by the processor 312, at least enable the processor 312 operate the data display device 50 to perform the functions and operations described herein. The memory 314 may be of any type of device capable of storing information accessible by the processor 312, such as a memory card, ROM, RAM, hard drives, discs, flash memory, or any of various other computer-readable medium serving as data storage devices, as will be recognized by those of ordinary skill in the art. Additionally, it will be recognized by those of ordinary skill in the art that a "processor" includes any hardware system, hardware mechanism or hardware component that processes data, signals or other information. Thus, the processor 312 may include a system with a central processing unit, graphics processing units, multiple processing units, dedicated circuitry for achieving functionality, programmable logic, or other processing systems.

The data display devices 50 further include at least one display screen, such as the touch screen display 304 or the discrete display screen 310. The processor 312 is configured to operate the display screen 304, 310 to display a graphical user interface via which a user can view the machine data that is collected and distributed by the data network devices 30, as well as information derived therefrom. The display screen 304, 310 may be an LCD screen or any of various other screens appropriate for a computing device. In the case of the touch screen display 304, the processor 312 is configured to receive input inputs from the user via virtual buttons or the like of the graphical user interface.

The data display devices 50 further include network communication module(s) 316 including at least one a transceiver, such as a Wi-Fi Module or Ethernet adapter, configured to communicate with the data network devices 30, either directly or via the access points 48, but may also include any of various other devices configured for communication with other electronic devices, including the ability to send communication signals and receive communication signals. Particularly, network communication module(s) 316 may further include additional transceivers which are common to smart phones, smart watches, laptop computers, tablet computers, desktop computers, such as Bluetooth transceivers and transceivers configured to communicate via wireless telephony networks. The processor 312 is configured to operate the network communication module(s) 316 to receive the machine data that is collected and distributed by the data network devices 30.

The data display devices 50 further include one or more user interfaces 318 that enable a user to interact with the graphical user interface displayed on the display screen 304, 310. The user interfaces 318 may comprise buttons (e.g., the buttons 308), speakers (e.g., the speakers 306), a mouse or other pointing device, a keyboard or other keypad, and a microphone, as will be recognized by those of ordinary skill in the art. The processor 312 is configured to operate the user interfaces 318 to receive inputs from the user and provide outputs to the user. Additionally, the data display devices 50 may further include a battery 320 configured to provide operational power or backup power.

Figure 5:
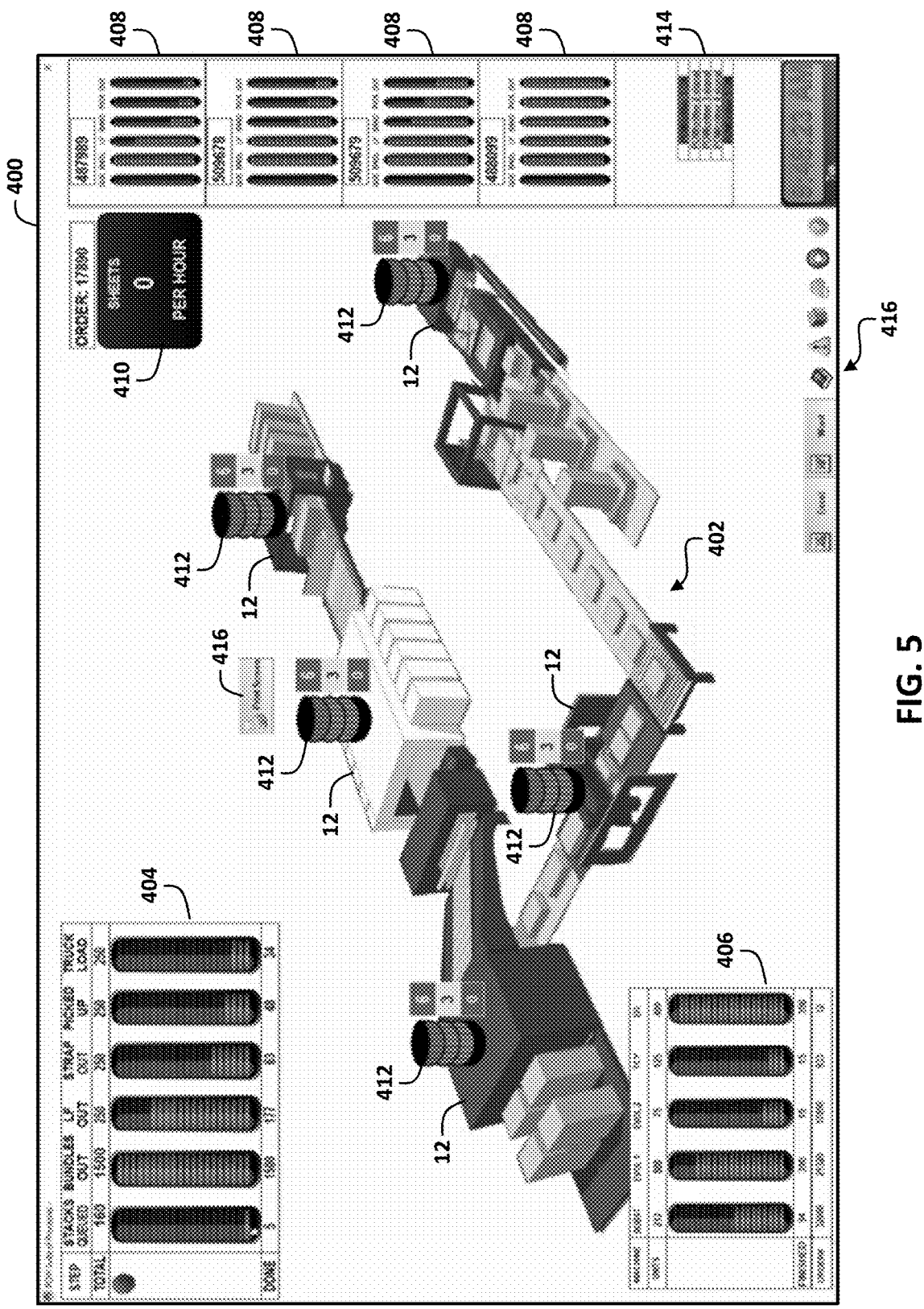
FIG. 5 shows an exemplary graphical user interface for display at a data display device.

FIG. 5 shows an exemplary graphical user interface 400 for display at a data display device 50. The graphical user interface 400 includes a graphical representation 402 of the machines 12 of the facility 10. The graphical representation 402 may, for example, comprise a three-dimensional model, one or more two-dimensional sprites, a photograph or drawing, or the like representing the machines 12 of the facility. Additionally, the graphical user interface 400 further includes a plurality of graphical depictions of the machine data that is collected and distributed by the data network devices 30. As used herein a "graphical depiction" of the machine data refers any chart, graph, plot, table, animation, map, or text that summarizes, or otherwise conveys, any aspect of the machine data.

In the illustrated embodiment, the graphical user interface 400 includes graphical depictions of the machine data in the form of bar graphs 404, 406, and 408. Each bar graph 404, 406, and 408 includes a plurality of bars, each representing a level of completion of a particular step or process to be performed by the machines 12 (e.g., to transform input materials 14 into output products 16). The bar graph 404 represents the completion of current order of goods to be prepared by the machines 12. The left most bar (e.g., "STACKS QUEUED") indicates a number of output products that are queued for production and have not yet begun production. Each of the remaining bars represent individual steps of the task (e.g., "BUNDLES OUT," "LF OUT," "STRAP OUT," "PICKED UP," and "TRUCK LOAD"). Accordingly, as the order is prepared, the left most bar populates downward (i.e., decreases in magnitude) and the remaining bars populate upward (i.e., increase in magnitude). The bar graph 406 is essentially similar to the bar graph 406 except that it represents the progress of sub-steps that are performed by a selected machine 12. Particularly, a user can select a particular machine 12 by pressing or clicking on the machine 12 within the graphical representation 402. Each bar of the bar graph 406 represents the progress of a particular sub-step that is performed by the selected machine 12 (e.g., "BOBST," "EVOL 1," "EVOL 2," "TCY," and "EFI"). Accordingly, as the sub-step is performed, the bars populate upward (i.e., increase in magnitude). Finally, the bar graphs 408 are essentially similar to bar graph 404 except that they represent previous orders, with the order number being indicated above each bar graph 408.

In the illustrated embodiment, the graphical user interface 400 further includes a graphical depiction of the machine data in the form of a performance summary 410 that provides one or more performance metrics for the facility 10 (e.g., "0 SHEETS PER HOUR"). The term "performance metric" as used herein refers to any standard of measurement relevant to an assessment of the performance, productivity, and efficiency of the facility 10 or of one or more particular machines 12 of the facility 10. In some cases, the raw machine data is processed substantially to provide a performance metric, but in other cases, machine data may simply be organized into a more presentable form to provide the performance metric.

In the illustrated embodiment, the graphical user interface 400 includes graphical depictions of the machine data in the form of virtual indicators 412 that display certain information based on a set of rules or other predetermined logic. In the illustrated embodiment, the virtual indicators 412 are each associated with a respective machine 12 and show an operational status of the respective machine 12 (e.g., off, on, idle, faulted, etc.). The virtual indicators 412 may also be configured to display any performance metric related to the associated machine 12. In some embodiments, the virtual indicators 412 may be virtual representations of real-world indicators, such as those of the data indicator devices 36 or an indicator built into a machine 12. In the illustrated embodiment, the graphical user interface 400 further includes graphical depictions of the machine data in the form of additional status indicators 414 that display additional status information, similar to the virtual indicators 412.

Finally, in the illustrated embodiment, the graphical user interface 400 includes shortcuts 416 (e.g., in the form of icons or other virtual buttons). Particularly, the user can touch, click, or otherwise select the shortcuts 416 to quickly access certain applications, functions, or documents, such as a print screen function, a word processor, a spreadsheet application, help information, or the like. In some embodiments, the shortcuts may include shortcuts to view live video of a particular camera 40, 42. In at least one embodiment, the graphical user interface 400 is an animated desktop such that it can be viewed in the background as other application windows are presented on top of the graphical user interface 400.

Figure 6:
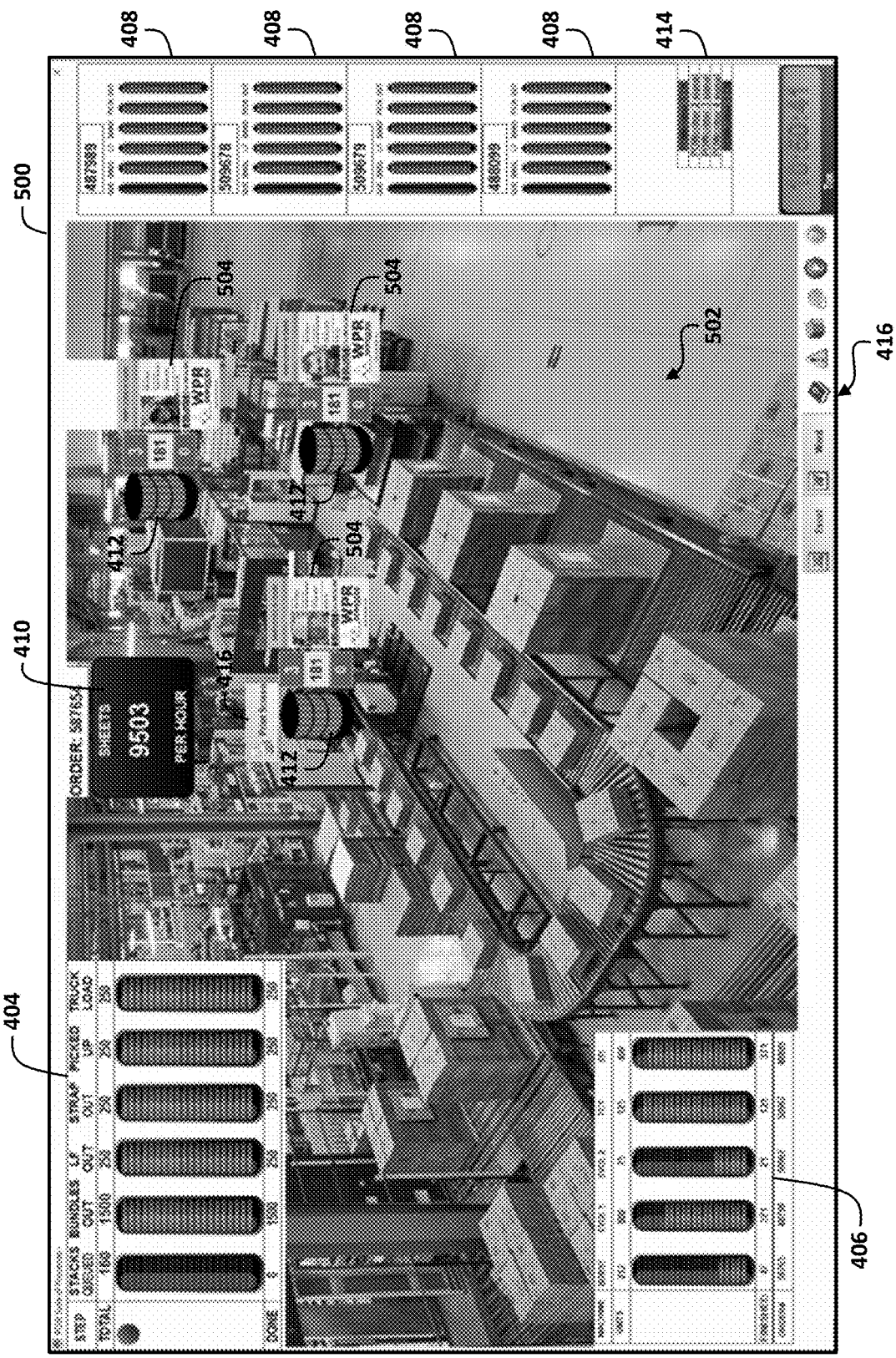
FIG. 6 shows a further exemplary graphical user interface for display at a data display device.

FIG. 6 shows a further exemplary graphical user interface 500 for display at a data display device 50, which is essentially similar to the graphical user interface 400. However, rather than the graphical representation 402, the graphical user interface 500 includes live video 502 of the facility 10, as captured by one of the fixed cameras 40, and graphical depictions 404, 406, 408, 412, and 414 of the machine data are overlaid on top of the live video 502. Additionally, the graphical user interface 500 further includes virtual personnel badges 504 that identify personnel that are working within the facility 10. In some embodiments, virtual personnel badges 504 may include a message that has been sent by that person (e.g., a message indicating that he or she needs assistance).

Figure 7:
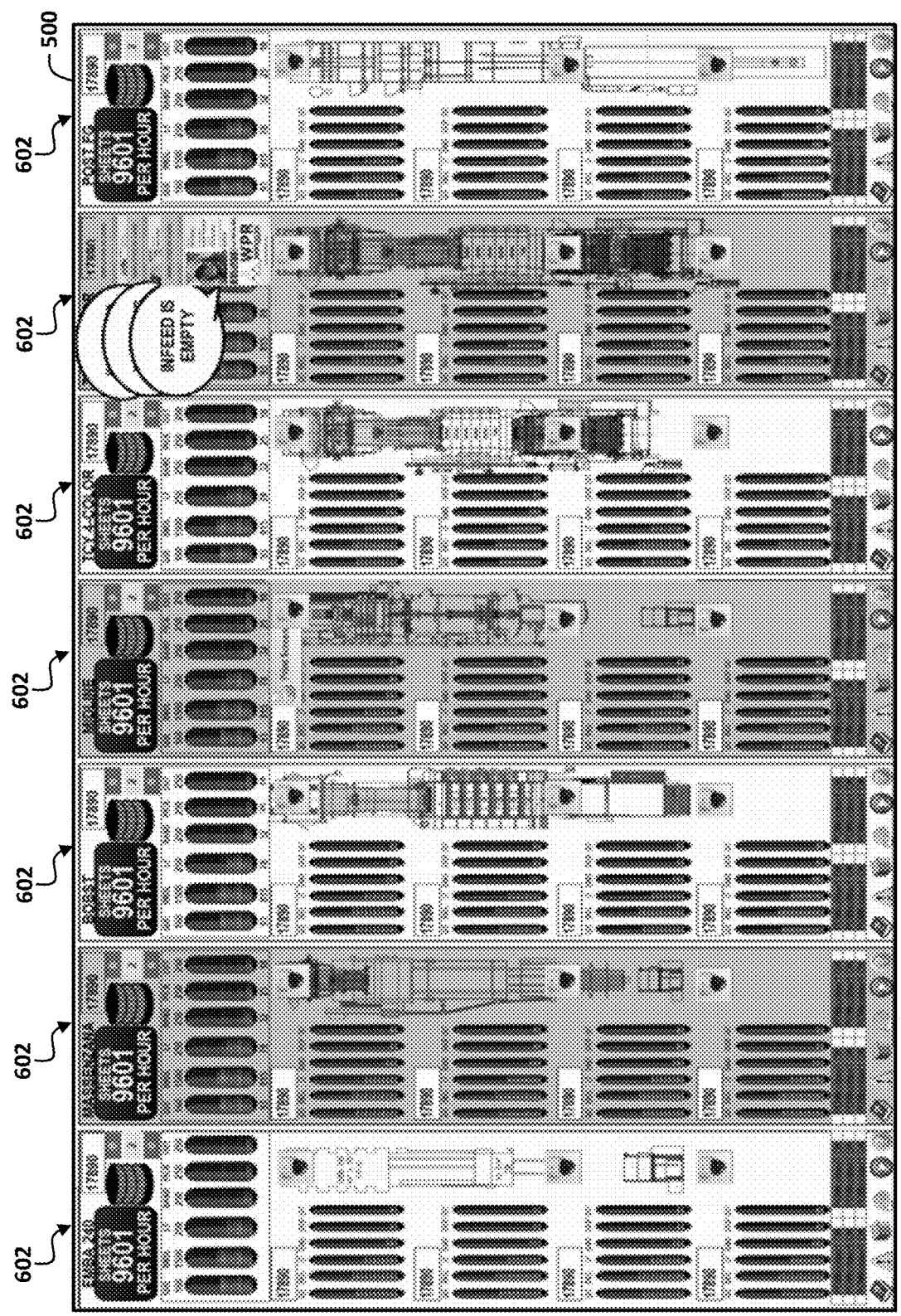
FIG. 7 shows yet another exemplary graphical user interface for display at a data display device.

FIG. 7 shows yet another exemplary graphical user interface 600 for display at a data display device 50. The graphical user interface 600 includes a plurality of sections 602 corresponding to different machines 12 or different sets of machines 12. Each section 602 includes a graphical representation of the respective machine 12 or set of machines 12, similar to the graphical representation 402 described above. Additionally, each section 602 includes a plurality of graphical depictions of machine data associated with the respective machine 12 or set of machines 12 (not individually labelled for simplicity of the figure), including bar graphs which are similar to the bar graphs 404, 406, 408 described above, performance summaries which are similar to the performance summaries 410 described above, virtual indicators which are similar to the virtual indicators 412 described above, and additional indicators which are similar to the virtual indicators 414 described above. Moreover, each section 602 includes shortcuts similar to the shortcuts 416 described above.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

What is claimed is:

1. A system for monitoring a plurality of machines of a facility, the system comprising:
a plurality of networked electronic devices configured to communicate with one another via at least one network, the plurality of networked electronic devices including:
at least one first networked electronic device connected to a respective machine of the plurality of machines and configured to receive machine data from the respective machine and transmit the machine data on the at least one network; and
at least one second networked electronic device having a video camera configured to capture video of the facility and being configured to transmit the captured video on the at least one network; and
at least one computing device having a display screen, the at least one computing device being configured to (i) receive the machine data from the at least one first networked electronic device, (ii) receive the captured video from the at least one second networked electronic device, and (iii) display a graphical user interface on the display screen, the graphical user interface including the captured video and a graphical depiction of the machine data that is overlayed upon the captured video, the graphical depiction including a first bar graph representing a progress of a task that is performed by the plurality of machines, the first bar graph having a plurality of bars, each bar in the plurality of bars indicating a cumulative progress toward completion of a respective step in a plurality of steps that make up the task that is performed by the plurality of machines.

2. The system according to claim 1, wherein at least one first networked electronic device includes a hardware interface configured to receive the machine data from at least one of a controller of the respective machine, an actuator of the respective machine, and a sensor of the respective machine.

3. The system according to claim 1, wherein the machine data includes inputs and outputs of a programmable logic controller of the respective machine.

4. The system according to claim 1, wherein the graphical user interface includes a plurality of virtual indicators, each virtual indicator in the plurality of virtual indicators being associated with a respective machine of the plurality of machines, each virtual indicator in the plurality of virtual indicators representing machine data received from the respective machine.

5. The system according to claim 4, wherein each virtual indicator in the plurality of virtual indicators represents an operating status of the respective machine.

6. The system according to claim 1, wherein the graphical user interface includes at least one performance metric of the facility, the at least one computing device being configured to determine the at least one performance metric based on the machine data.

7. The system according to claim 6, wherein the at least one performance metric of the facility includes of a productivity of the facility.

8. The system according to claim 1, wherein the graphical depiction include a plurality of bar graphs, each bar graph in the plurality of bar graphs representing a progress of a respective task that is performed by the plurality of machines, each bar graph in the plurality of bar graphs having a respective plurality of bars, each bar in the respective plurality of bars indicating a cumulative progress toward completion of a respective step in a respective plurality of steps that make up the respective task that is performed by the plurality of machines.

9. The system according to claim 1, wherein the task comprises transforming input materials into output products by way of the plurality of steps.

10. The system according to claim 1, wherein the at least one network includes a wired network and a wireless network and at least some of the plurality of networked computing devices include communication hardware configured to communicate via both of the wired network and the wireless network.

11. The system according to claim 10, wherein the wireless network comprises a UHF radio network.

12. The system according to claim 10, wherein the wireless network comprises a mesh network.

13. The system according to claim 10, wherein the wired network comprises a TCP/IP network.

14. The system according to claim 10, wherein the wired network is implemented on power lines of the facility.

15. The system according to claim 1, wherein the video camera of the at least one second networked electronic device is configured to capture a video clip in response to a predetermined triggering event being detected.

16. The system according to claim 15, wherein at least one computing device is configured to generate and transmit an electronic mail message in response to a predetermined triggering event being detected, the electronic mail message including the captured video clip.

17. The system according to claim 1, wherein at least one third networked electronic device of the plurality of networked electronic devices is configured to operate a component of at least one machine in the plurality of machines in response to a predetermined triggering event being detected.

18. The system according to claim 1, wherein at least one fourth networked electronic device of the plurality of networked electronic devices comprises at least one output device and is configured to operate the least one output device to indicate an operating status of at least one machine in the plurality of machines based on the machine data.

19. The system according to claim 1, wherein the at least one computing device is further configured to (i) receive a selection, via the graphical user interface, of a particular machine from the plurality of machines and (ii) display, in the graphical user interface, a second bar graph that indicates a progress of a particular sub-step of a step in the plurality of steps that is performed by the selected machine.

20. The system according to claim 1, wherein (i) a first bar in the first bar graph indicates a number of output products that are queued for production and decreases in magnitude during progression of the task and (ii) remaining bars in the first bar graph represent individual steps of plurality of steps that make up the task and increase in magnitude during progression of the task.

* * * * *